United States Patent [19]

Kolenc et al.

[11] Patent Number: 4,750,709

[45] Date of Patent: * Jun. 14, 1988

[54] DIAPHRAGM VALVE

[75] Inventors: Terrence J. Kolenc, Mentor; Gary W. Scheffel, Streetsboro, both of Ohio

[73] Assignee: Nupro Company, Willoughby, Ohio

[*] Notice: The portion of the term of this patent subsequent to Jun. 9, 2004 has been disclaimed.

[21] Appl. No.: 40,120

[22] Filed: Apr. 20, 1987

Related U.S. Application Data

[63] Continuation-in-part of Ser. No. 863,714, May 16, 1986, Pat. No. 4,671,490.

[51] Int. Cl.[4] .................. F16K 31/00; F16K 31/44
[52] U.S. Cl. .................. 251/335.2; 251/267; 251/214; 137/556
[58] Field of Search .................. 251/335.2, 267, 214; 137/556

[56] References Cited

U.S. PATENT DOCUMENTS

| 679,062 | 7/1901 | Staedeli et al. | 251/335.2 |
| 3,982,729 | 9/1976 | Tricini | 251/335.2 |

Primary Examiner—A. Michael Chambers
Attorney, Agent, or Firm—Fay, Sharpe, Beall, Fagan, Minnich & McKee

[57] ABSTRACT

A diaphragm valve which uses a multiple layer annular metal diaphragm welded about its inner periphery to a valve operating stem. The diaphragm is sealingly clamped about its outer periphery to the valve body and is also clamped about its inner periphery at a location spaced outwardly of the weld to prevent the weld from being subjected to flexure stresses during valve actuation. The actuating assembly is arranged to produce non-rotary, reciprocatory movement of the operating stem through a bonnet mounted rotary actuator. An improved stem tip seal arrangement is also disclosed.

7 Claims, 4 Drawing Sheets 4,750,709

1

DIAPHRAGM VALVE

BACKGROUND OF THE INVENTION

This application is a continuation-in-part of application Ser. No. 863,714, filed May 16, 1986, now U.S. Pat. No. 4,671,490 issued June 9, 1987 for "Diaphragm Valve".

The subject invention is directed toward the valve art and, more particularly, to an improved diaphragm-type valve.

Metal diaphragm valves are often used in systems handling toxic and dangerous fluids. The valves are preferred in such environments because the diaphragm can provide total hermetic sealing between the valve cavity and the valve operating mechanism.

As is apparent, the diaphragm is a very critical element in such valves since failure of the diaphragm can result in sudden escape of the dangerous fluids. It is generally recognized that the life of the diaphragm element is closely related to the types of stresses to which it is subjected during operation. Consequently, attempts have been made to improve not only the diaphragm element but, also, the manner in which it is mounted and actuated. Generally these attempts have significantly increased the complexity of the valves and/or the problems associated with their manufacture and maintenance.

The subject invention provides a diaphragm-type valve which includes a unique diaphragm construction and mounting arrangement which prevents the diaphragm from being subjected to any undesirable stresses and provides extremely long diaphragm life.

The invention also provides an improved operating mechanism which allows the diaphragm and the associated valve element to be moved between the open and closed positions without subjecting the diaphragm to torsional loads or the like. In addition, the operating mechanism provides a readily visual indication of the valve operating position.

BRIEF DESCRIPTION OF THE INVENTION

In accordance with one aspect of the invention, there is provided a diaphragm valve which includes a valve body having an opening that extends inwardly from the exterior of the body to define a generally cylindrical valve chamber. A valve operating stem member is positioned to extend axially into the valve chamber for engagement with a valve element. The valve chamber is sealed by an annular flexible metal diaphragm having an outer periphery which is clampingly joined to the body and an inner periphery joined to the stem circumferentially thereof. Actuating means are provided for selectively moving the stem axially of the valve chamber without applying torsional loads to the diaphragm. The actuating means include a bonnet member through which the stem extends with cooperating surfaces between the bonnet and the stem for permitting free axial movement of the stem while preventing axial rotation. A drive member is rotatably carried by the bonnet and has threads in engagement with corresponding threads formed on the stem. A bonnet nut is threadedly connected to the body and includes radially extending surfaces to apply a clamping force to the bonnet member and to retain the drive member in the bonnet. Preferably, anti-friction bearing means are located between the

2 bonnet nut and the drive member, as well as between the bonnet nut and the bonnet member.

The noted arrangement is particularly suited for use in large diameter and/or high pressure diaphragm valves. The bearing means between the bonnet nut and the bonnet member allows extremely high clamping forces to be applied to the bonnet member and the diaphragm. Similarly, the torque required to rotate the drive member is maintained at a reasonable level even when the valve is used for controlling extremely high pressure fields.

Accordingly, a primary object of the invention is the provision of an actuating assembly which is particularly suited for large diameter and high pressure diaphragm valves.

A further object of the invention is the provision of a valve bonnet and actuator construction which reduces the torque required to seal the diaphragm.

A still further object is the provision of a valve of the type discussed wherein high internal pressures do not greatly affect the torque required to effect valve opening and closing.

The above and other objects and advantages will become apparent from the following description when read in conjunction with the accompanying drawings wherein.

Figure 1:
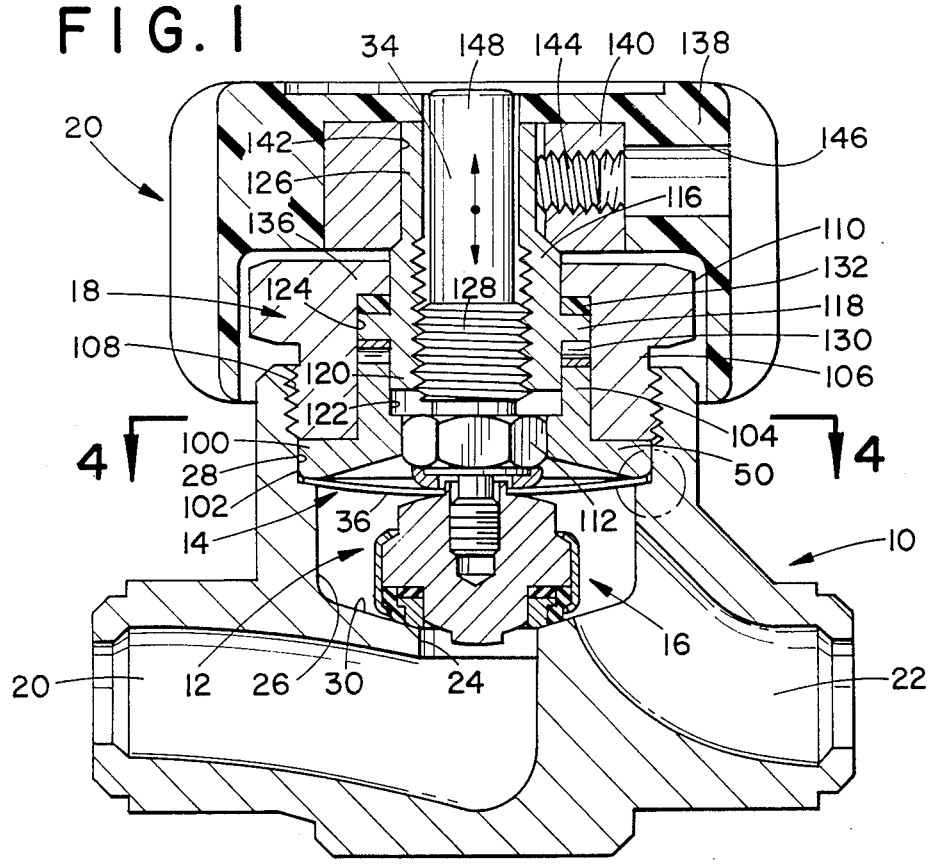
FIG. 1 is a cross-sectional view of a diaphragm valve incorporating the subject invention.

Referring more particularly to the drawings where the showings are for the purpose of illustrating a preferred embodiment of the invention only and not for the purpose of limiting same, FIG. 1 best shows the overall arrangement of a valve formed in accordance with the subject invention and generally comprising a main body 10 having a generally cylindrical internal valve chamber 12 which is sealed at its outer end by a diaphragm assembly 14. Positioned within the valve chamber 12 and arranged to control flow therethrough is a stem tip seal assembly 16. The valve is moved between its open and closed positions by an operating assembly 18 including a handle member 20.

In the embodiment under consideration, the main body 10 is formed of a suitable metal such as stainless steel and is provided with an inlet passage 20 and an outlet passage 22. As shown, inlet passage 20 terminates in an upwardly open port 24 which is axially aligned with the generally cylindrical valve chamber 12. As illustrated, the valve chamber 12 is preferably formed with a stepped bore which includes a first cylindrical section 26 and an outer, somewhat larger diameter section 28. The inner end of the valve chamber 12 terminates in a conically shaped, inclined bottom wall 30 which defines an annular valve seat area about port 24.

Figure 5:
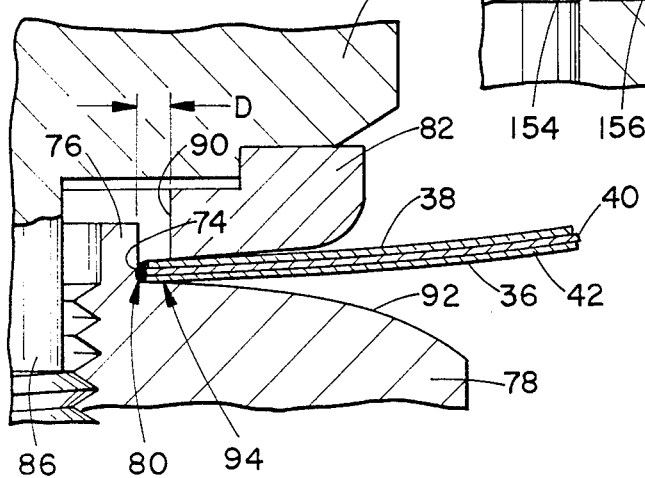
FIG. 5 is an enlarged view of the circled portion of FIG. 2.

Mounted to extend axially into the valve chamber 12 is an operating stem member 34 which has the stem tip seal member 16 carried on its inner end in a manner subsequently to be described. The valve chamber 12 is sealed by the previously mentioned diaphragm assembly 14. In the embodiment under consideration, the diaphragm assembly 14 comprises a multiple layer metal diaphragm element 36 which is formed generally as described in commonly assigned U. S. application Ser. No. 482,215, filed Apr. 5, 1983 now U.S. Pat. No. 4,606,374 issued Aug. 19, 1986 for a VALVE, the disclosure of which is herein incorporated by reference. Broadly, the diaphragm 36 is, as shown in FIG. 5, formed as a plural layered diaphragm comprised of three separate annular metal disk elements 38, 40 and 42. As shown, the disk members 38, 40 an 42 are preferably of equal thickness and, as described in the aforementioned patent application, each diaphragm forming disk member preferably is formed from Austenitic 316 stainless stell which has been heat treated to a hardness of not less than about 38 on the Rockwell C Scale.

Referred again to FIG. 2, it will be noted that the diaphragm 36 has its outer peripheral portion 44 received on a shoulder 46 formed at the juncture between cylindrical bores 26, 28. The diaphragm 36 is sealingly .clamped to shoulder 46 by bonnet member 50 in a manner subsequently to be described.

Figure 6:
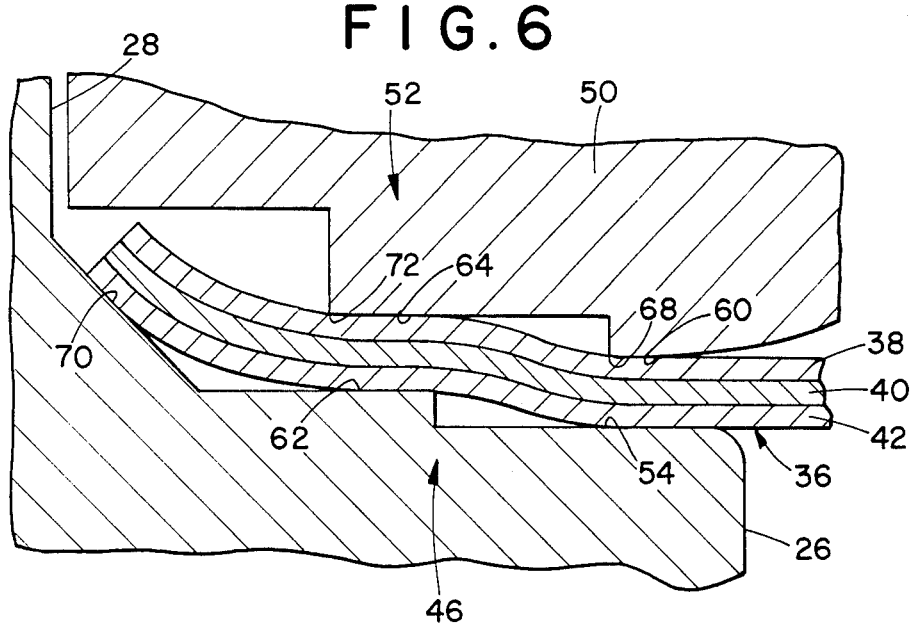
FIG. 6 is an enlarged cross-sectional view of the circled portion of FIGURE.

Referring particularly to FIG. 6, the relationship between the shoulder 46 and the clamping face 52 of bonnet member 50 is shown in some detail. The particular clamping arrangement utilized is shown and described in more detail in the previously mentioned common assigned application. In general, however, shoulder 46 and bonnet clamping surface 52 are provided with spaced-apart opposite flat and parallel circumferential surface areas 54 and 60, respectively, which provide primary clamping surfaces to clamp and grip the diaphragm inwardly from its outer periphery. A second pair of flat and parallel clamping surfces 62 and 64 are also axially and radially spaced from the primary clamping surfaces 54 and 60. The primary and secondary surfaces are separated by relatively sharp corners 66 and 68 corners which the diaphragm 36 is bent axially. The corners 66 and 68 provide excellent sealing against the opposite faces of diaphragm 36. Preferably, the machining tolerances for the surface 46 and the associated clamping surface 52 are selected such that the spacing between surfaces 54 and 60 will always assure maximum clamping action at this area as opposed to the clamping action between surfaces 62 and 64. This ensures that the primary diaphragm sealing occurs at surfaces 54, 56 to better accommodate valve purging.

The outer periphery of the diaphragm 36 is further bent and clamped by secondary corners 72 and chamfered corner 70. These corners are effectively axially spaced from one another a distance less than the actual spacing between corners 66 and 68. Thus, the outer peripheral portion of diaphragm 36 is deformed to a greater degree than the deformation that takes place between corners 66 and 68. As fully described in the previously mentioned application, this relationship provides an extremely effective peripheral seal for the diaphragm.

Referring again to FIGS. 2 and 5, it will be noted that the diaphragm 36 includes a central opening 74 which is closely received about a vertically extending collar portion 76 formed on the main body 78 of the stem tip assembly 16. To seal between the stem tip body 78 and the inner periphery 74 of diaphragm 36, a continuous full penetration weld, as shown at 80, is provided completely about the inner periphery of the diaphragm to positively join and seal it to the body 78. In addition, the weld joins all layers of the diaphragm to also prevent any possible leak paths between the layers. Preferably, and in accordance with an aspect of the invention, means are also provided to mechanically clamp the diaphragm 36 to the body 78 at a location radially outwardly of the weld 80. In the embodiment shown, the stem tip body 78 is threadedly connected at 84 to the lower reduced diameter end portion 86 of stem 34. The clamping of the inner periphery of the diaphragm is accomplished by cooperation between an annular clamp ring 82 located beneath the larger diameter portion 88 of stem 34 and the upper surface of the diaphragm 36. As shown, the annular ring 82 has an inner open diameter 90 which is substantially larger than the inner diameter 74 of the diaphragm 36. This assures that when the stem tip body 78 is threadedly tightened on the stem 34 clamping between the under surface of ring 82 and the upper surface of stem tip body 78 takes place at a location significantly outwardly of the weld 80. Preferably distance "D" is predetermined to be sufficiently outwardly of weld 80 to prevent any bending forces generated during reciprocation of the valve and flexure of the diaphragm 36 from being transmitted to the weld 80. This distance may, of course, vary depending upon the size and/or thickness of the diaphragm.

Preferably, the upper surface 92 of the stem tip body 78 is smoothly contoured away from the diaphragm as shown. Similarly, the under surface of the clamp ring member 82 is also smoothly contoured away from the upper surface of diaphragm 36. This arrangement allows the clamping forces applied by clamp ring 82 to be concentrated in the area 94 and allows the diaphragm 36 to undergo the required deflection without being subjected to sharp bends or the like.

The overall arrangement and operation of the operating assembly 18 can best be understood by reference to FIG. 1. As shown therein, the bonnet member 50 is provided with an outwardly extending flange like portion 100 which is sized so that its outer periphery 102 is closely and slidably received in the bore section 28. A generally axially extending sleeve portion 104 extends upwardly from flange portion 100. Bonnet member 50 is clampingly retained in the enlarged bore 28 by a bonnet nut member 106 which is threadedly received in bore 28 by cooperating threads 108. The upper end of the bonnet nut member 106 is provided with suitable wrench flats 110 to permit the nut to be tightened and released from the bore 28. In addition, it should be appreciated that tightening the bonnet nut member 110 causes the bonnet member 50 to be moved to the diaphragm clamping position previously discussed.

Figure 4:
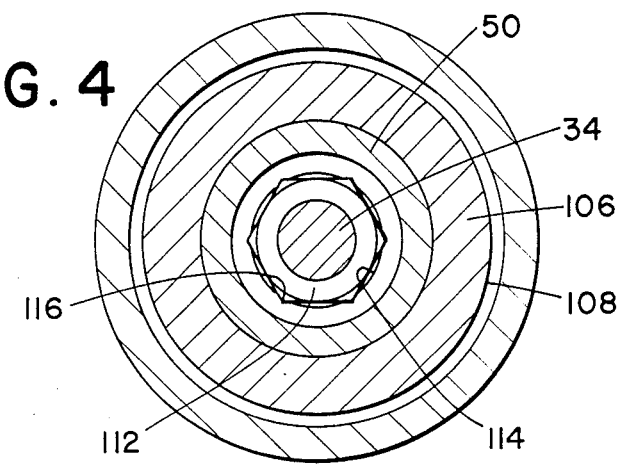
FIG. 4 is a cross-sectional view taken on line 4—4 of FIG. 1.

The stem member 34 extends axially through the bonnet member 50 and the bonnet nut member 106 as shown. Preferably, the stem member 34 is prevented from rotating relative to the bonnet nut member by cooperating surfaces on the stem and the bonnet. Specially, according to the subject embodiment, the stem 34 (as best shown in FIG. 4) includes a radially extending section 112 which has a generally hexagonal configuration. The bonnet member 50 is provided with a central opening 114 which is broached or otherwise machined to provide longitudinally extending grooves 116 arranged to closely but slidably engage the corners of the hex configuration of portion 112. The grooves 116 thus permit free axial sliding of the stem 34 while preventing any rotational movement.

Selective axial movement of the stem 34 is provided by an actuating member 116 which has a generally cylindrical configuration with an outwardly extending flange 118. The lower end 120 of the actuator 116 is closely received and guided in a bore 122 formed in the sleeve portion 104 of bonnet member 50. The flange portion 118 is sized so as to be closely and rotatably received in the axially extending bore 124 of the bonnet nut member 106. The length of the actuator 116 is such that an upper end portion 126 extends outwardly of the bonnet nut 110. Suitable threads 128 are formed between the exterior of the stem 34 and the interior of the actuating member 116. Preferably, the threads 128 are left-hand threads so that clockwise rotation of the actuating member 116 produces inward or closing movement of stem 34.

In the embodiment shown, the actuating member 116 is continually biased in an outward direction by a spring wave washer 130 positioned between the top of bonnet sleeve 104 and the under surface of flange 118. In addition, a bearing washer 132, formed from bronze or the like, is positioned between the top of flange 118 and the under surface of a radially inwardly extending flange 136 carried by bonnet nut member 106. This arrangement firmly captures and holds the actuating member 116 against axial movement while permitting it to have free driving rotation for adjustment of stem 34.

Selective rotation of the actuating member 116 is provided by handle member 20 which is joined to the outer end 126 of operating member 116. Many different types of handles could be provided; however, according to the subject embodiment, the handle 20 comprises a main handle body 138 which is molded about a metal insert 140. Insert 140 includes a center bore 142 which is sized so as to be closely received on the outer end of actuating member 116. A socket head setscrew or the like 144 is carried in the insert member 140 for connecting the handle 20 to the actuating member 116. As shown, a suitable opening 146 is molded or otherwise formed in the handle body 138 to provide access to the setscrew 144.

Preferably, the stem member 34 has an outer free end 148 which is of a length such that as the valve is moved to an open position the free end 148 of stem 34 extends outwardly of the handle body 138 to provide a visual indication that the valve is in an open position. The stem 148 is sized such that when the valve is in the closed position shown in FIG. 1 the top end of the stem is substantially flush with the top surface of handle 20.

Figure 2:
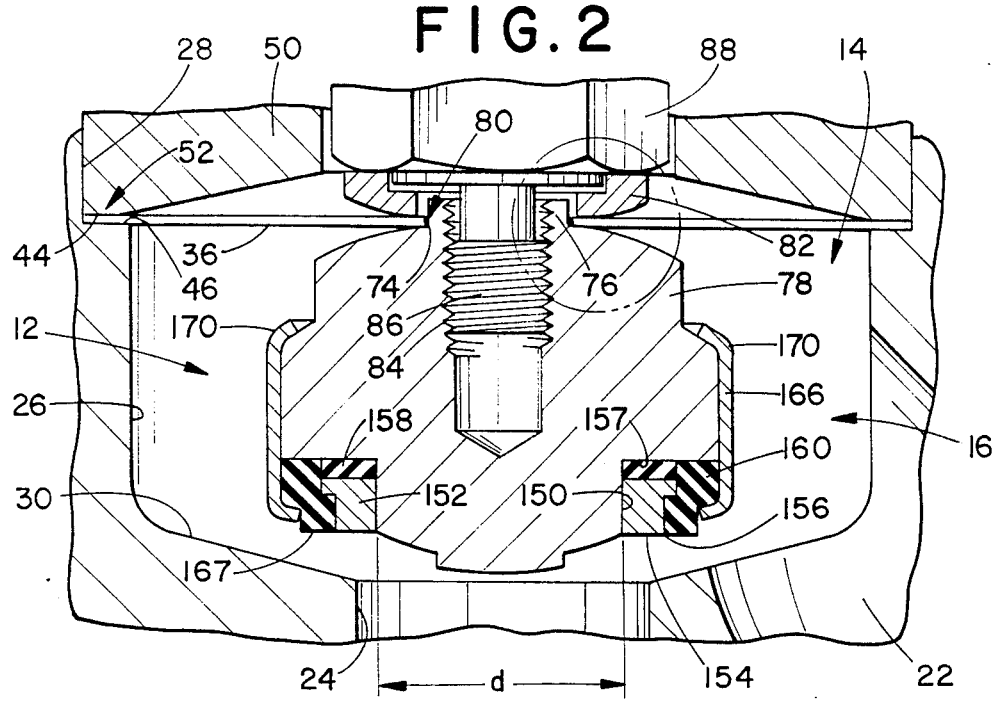
FIG. 2 is an enlarged cross-sectional view of the valve chamber and stem tip assembly of the valve of FIG. 1.
Figure 3:
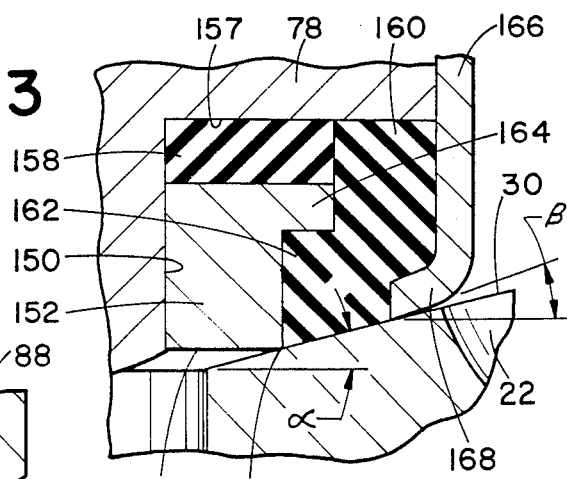
FIG. 3 is a greatly enlarged cross-sectional view showing the sealing portion of the stem tip assembly in closed position in engagement with the seat.

The structure and arrangement of the stem tip seal assembly 16 can best be understood by reference to FIGS. 2 and 3. As shown therein, the lower end of stem tip main body 78 is provided with a circumferentially extending recess 150 which opens axially and radially of the body 78. The inner diameter d of recess 150 is slightly less than the diameter of port 24. Carried on the lower end of body 78 and slidably received on the inner wall of recess 150 is a metal seal ring member 152. Rign 152 has a generally flat lower face 154 which terminates in an outer, relatively sharp corner 156. The corner 156 is arranged to engage the inclined bottom wall 30 of valve chamber 26 circumferentially about the port 24 as the valve moves toward a closed position shown in FIG. 3. Corner 156 thus proides a metal-to-metal generally line contact seal about port 24.

Positioned axially inwardly of the ring 152 and captured between the rear of the ring and the axially facing surface 157 of rcess 150 is a resilient ring or a washer member 158. In the embodiment under consideration, the ring 158 is formed from virgin polytetrafluoroethylene and is sized so as to substantially completely fill the area or space between ring 152 and surface 157.

Positioned radially outwardly of ring 152 and 158 is a seal ring 160 formed from a suitable resilient, abrasion resistant seal material such as chlorotrifluorethylen or a filled polytetrafluoroethylene. For reasons which will subsequently be described, ring 160 has a greater stiffness than previously mentioned ring 158. The ring 160 is configured to substantially fill the axially open space between the inner rings 152 and 158 and the outer diameter of the body 78. As shown, ring 160 has a radially inwardly extending portion 162 which extends under a radially outwardly extending flange 164 formed on ring 152. Portion 162 of ring 160 thus acts to axially retain ring 152 in position on body 78. Preferably, and for reasons subsequently to be discussed, the lower or seal face 167 of seal ring 160 is generally coplanar with, or slightly below the corner 156 of ring 152 when the rings are in their assembled position on body 78.

The rings 152 and 160 are retained in position by a circumferentially continuous metal sleeve member 166 which is closely and slidably received on the outer surface of body 78. As illustrated, sleeve member 166 extends downwardly about the outer circumference of seal ring 160 and includes an inwardly extending continuous flange portion 168 which extends under the axially outer portion of ring 160. The sleeve member 166 is slidably retained on the body 78 by radially inwardly extending flanges or tabs 170 (see FIG. 2) which are bent inwardly over a suitable shoulder on body 78. Additionally, and for reasons subsequently to be discussed, the continuous flange portion 168 is preferably inclined at an angle beta which is slightly greater than the angle of inclination alpha of end wall 30 of chamber 12.

With the stem tip assembly 12 arranged as shown, a closing movement of the valve results in contact being made between the seat area and the end face 167 of the resilient seal member 160. As further closing movement takes place, the seal ring 160 is compressed and the outer corner 156 of rigid ring 152 engages the seat area radially inwardly of the seal ring 160. With further closing movement the compressive forces acting between the seal force 167 of the stiffer resilient seal ring 160 increase. The forces between corner 156 of ring 152 and the seal also increase but to a lesser extend because the less stiff and more resilient ring 158 can more readily undergo compression to allow some rearward movement of ring 152 relative to body 78 and ring 160. This allows ring 152 to maintain firm engagement with the seat area while allowing the sealing pressures between surface 167 and the seat to be increased. Additionally, the compressive forces acting within ring 160 maintain a downward force on the sleeve 166 because of the flange portion 168. With the final closing movement of the valve the lower edge of sleeve 166 engages the seat area with line contact circumferentially of seal ring 160. The seal ring 160 is thus confined between the inner rigid ring 152 and the outer sleeve 166. In addition, it should be noted that the inner ring 152 and the outer sleeve 166 make metal-to-metal line contact with the seat and totally confine the resilient seal ring 160.

Figure 7:
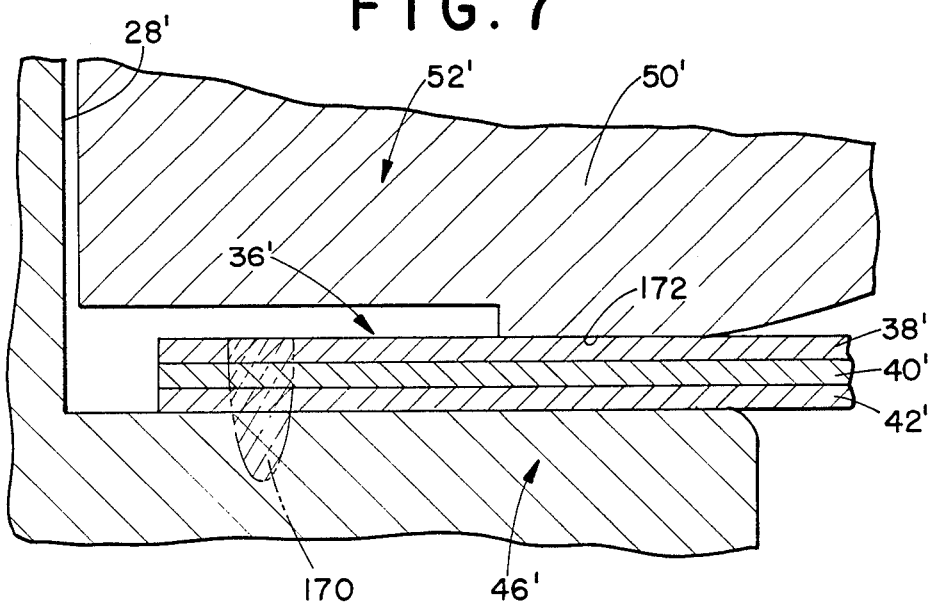
FIG. 7 is an enlarged cross-sectional view like FIG. 6 but showing a modified arrangement for sealing the outer periphery of the diaphragm to the body.

FIG. 7 shows a modified form of mounting and sealing for the outer periphery of the diaphragm to the valve body 10. In the FIG. 7 embodiment, like reference numerals differentiated by a prime suffix (') have been used to identify parts corresponding to those previously described with reference to FIGS. 1-6. The description of such parts is to be taken as equally applicable to those of the FIG. 7 embodiment unless otherwise noted. In particularly, in the FIG. 7 embodiment, the shoulder 46' is made flat without the stepped configuration of FIG. 6. The diaphragm 36' rests on the flat shoulder 46' and is continuously welded to the shoulder by a fully penetrating weld 170 located relatively closely to the outer periphery of the diaphragm. This weld firmly attaches and completely seals the individual disk members to each other and the body 10'. The diaphragm is also clamped to the shoulder 46' by a clamp face 172 which extends outwardly from bonnet member 50' to provide a circumferentially continuous, relatively narrow clamping band located radially inwardly of weld 170. Preferably the face 172 extends generally parallel to shoulder 46'.

The relationship between the weld 170 and the clamp surface 172 is such that the flexure forces produced in diaphragm 36' during valve operation cannot be transmitted to the weld.

Figure 8:
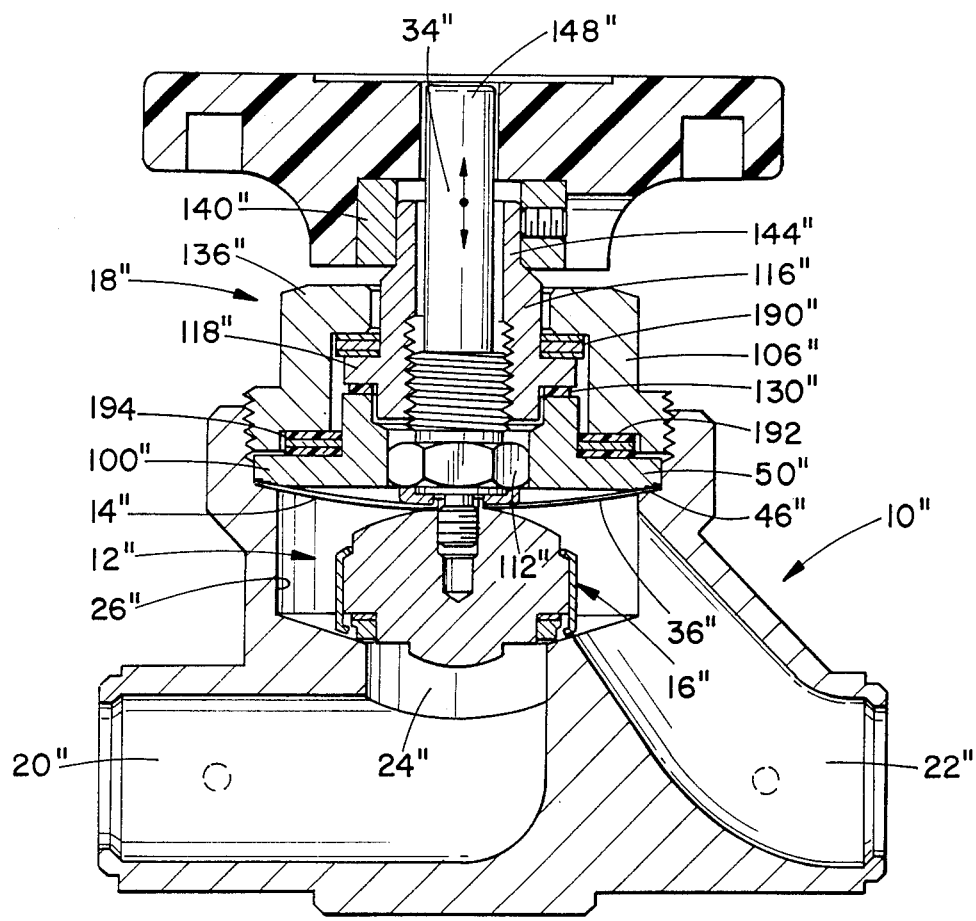
FIG. 8 is a cross-sectional view of a valve embodying a modified construction of the diaphragm clamping and actuating mechanism.

FIG. 8 illustrates a further embodiment of the invention which is especially suited for relatively large size valves or for valves intended for high pressure operation. In the FIG. 8 embodiment, like reference numerals differentiated by a double prime suffix have been used to identify the components which correspond to those previously described in the FIGS. 1-6 embodiment. The description of one such component is to be considered as applicable to the other unless otherwise noted.

As noted above, the subject embodiment is particularly intended for use in constructing large size valves or for valves intended for high pressure use. In the larger size, relatively high pressures must be generated between the cooperating clamping faces of the bonnet 50" and the shoulder 46" to properly clamp and seal the periphery of the diaphragm 36". In addition, when the valve is used for extremely high pressures, the forces acting axially outward against the stem tip and the diaphragm 36" are carried by the actuating member 116". These high forces tend to greatly increase the torque which must be applied to rotate the actuating member and move the valve between its opened and closed positions. With the subject embodiment, a sifnificant reduction in the torque required to operate the valve is achieved by positioning a first anti-friction bearing means 190 between the upper surface of flange 118" and the undersurface of flange 136" of the bonnet nut member 106". The first anti-friction bearing means 190 could be of a variety of conventional types but is peferably a needle-type roller bearing specifically designed for use as a thrust bearing. Anti-friction bearing 190 has an internal opening sized so as to be closely received on the exterior of actuating member 116" as shown. Both the actuating member 116" and the bearing 190 are maintained under a continual outward bias by the spring wave washer 130". This arrangement captures and holds the actuating member 116" against axial movement while permitting it to have free driving rotation for adjustment of the stem 34". The first anti-friction bearing means 190 allows the actuating member 116" to carry extremely high outwardly directed forces without producing a signficant increase in the torque required to rotate. In addition, the wave washer 130" maintains the actuating member and bearing under a predetermined minimum biasing force such that proper feel and actuation of the actuating member is obtained even when the valve is operating under very low pressure conditions.

In order to reduce the torque required to achieve sealing of the outer periphery of diaphragm member 36", a second anti-friction bearing means 192 is positioned between the lower end of the bonnet nut member 106 and the radially extending flange-like portion 100" of the bonnet 50". The anti-friction bearing 192 is, also, a needle-type roller bearing particularly intended for use as a thrust bearing. As shown, the inner diameter of the bearing 192 is closely received on the outer circumference of the bonnet 50". Preferably, a circumferential recess 194 is formed in the lower end of the bonnet nut 106" and receives the bearing 192. As can be appreciated, the forces generated during the tightening of the bonnet nut 106 are transmitted through the second bearing member 192 to the bonnet 50". Extremely high forces can be generated without producing high torque and without rotating the bonnet 50".

The invention has been described in great detail sufficient to enable one of ordinary skill in the art to make and use the same. Obviously, modifications and alterations of the preferred embodiment will occur to others upon a reading and understanding ofo the specification. It is intended to include all such modifications and alterations insofar as they come within the scope of the appended claims or the equivalents thereof.

Having thus described the invention, it is now claimed:

1. A diaphragm valve comprising:
   a valve body having an opening which extends inwardly from the exterior of said body to define a valve chamber;
   a valve operating stem member extending axially into said valve chamber from a position exteriorly of said body;
   a diaphragm having an outer periphery joined to said body and an inner periphery joined to said stem for sealing said valve chamber and permitting said stem to have limited movement axially of said chamber; and
   actuating means for selectively moving said stem, said actuating means including:
   a bonnet member through which said stem extends with cooperating surfaces between said bonnet and said stem for permitting axial movement of said stem while preventing axial rotation;
   a drive member rotatably carried by said bonnet member in surrounding relationship to said stem member and having threads engaging said stem for producing axial movement of said stem with rotation of said drive member;
   a nut member surrounding said bonnet member and said drive member, said nut member threadedly joined to said body for clamping said bonnet member to said body;
   first anti-friction bearing means in said nut member engaged with said drive member for preventing axial outward movement of said drive member while permitting axial rotation;
   spring means for biasing said drive member axially outward into engagement with said bearing means; and, second anti-friction bearing means located between said nut member and said bonnet member for transmitting diaphragm clamping forces from said nut member to said bonnet member.

2. The diaphragm valve as defined in claim 1 wherein said first anti-friction bearing means is positioned between axially facing shoulders on said drive member and said nut member and wherein said spring means is located axially inwardly of said bearing means.

3. The diaphragm valve as defined in claim 1 wherein said nut member is axially received in the outer end of said opening and wherein the outer periphery of said diaphragm is clamped between said bonnet and said body.

4. The diaphragm valve as defined in claim 1 wherein said drive member extends outwardly of said nut member.

5. The diaphragm valve as defined in claim 1 wherein said second anti-friction bearing means is located axially inward of said spring means.

6. The diaphragm valve as defined in claim 1 wherein said second anti-friction bearing means lies in a plane perpendicular to the axis of said stem.

7. The diaphragm valve as defined in claim 1 wherein said drive member includes a radially extending circumferential flange which engages said first anti-friction bearing means and said spring means.

* * * * *